United States Patent [19]
Frick et al.

[11] 3,789,086

[45] Jan. 29, 1974

[54] METHOD FOR PRODUCING CHROMANOLS

[75] Inventors: Heinrich Frick, Riehen; Niklaus Halder; Willy Vogler, both of Oberwil, all of Switzerland

[73] Assignee: Hoffman-La Roche Inc., Nutley, N.J.

[22] Filed: Dec. 29, 1971

[21] Appl. No.: 213,831

[30] Foreign Application Priority Data
Jan. 11, 1971  Switzerland............................ 328/71

[52] U.S. Cl. ............................................ 260/345.5
[51] Int. Cl. ............................................. C07d 7/26
[58] Field of Search .................................. 260/345.5

[56] References Cited
UNITED STATES PATENTS
2,411,968  12/1946  Karrer et al. .................... 260/345.5
3,476,772  11/1969  Hoyle et al. ..................... 260/345.5

*Primary Examiner*—John M. Ford
*Attorney, Agent, or Firm*—Samuel L. Welt; Jon S. Saxe; William H. Epstein

[57] ABSTRACT

A process for producing chromanols such as Vitamin E by condensing an isoprenol or isoprenol derivatives with a hydroquinone in the presence of hydrogen chloride and an iron component which can be iron, ferrous chloride or mixtures thereof.

7 Claims, No Drawings

METHOD FOR PRODUCING CHROMANOLS

BACKGROUND OF INVENTION

It is known that, for example, 2,5,7,8-tetramethyl-2-(4,8,12-trimethyltridecyl)-6-chromanol [α-tocopherol] and its derivatives can be manufactured by condensing trimethylhydroquinone with phytyl bromide in the presence of zinc chloride [Helv. Chim. Acta 21 (1938),524] or by condensing trimethylhydroquinone with phytol in the presence of zinc chloride and acetic acid [J. Am. Chem. Soc. 61 (1939), 2618]. Trimethylhydroquinone has also previously been reacted with isophytol in the presence of zinc chloride and hydrogen chloride to give α-tocopherol [Helv. Chim. Acta 49 (1966), 2304]. Furthermore, the manufacture of α-tocopherol by condensing trimethylhydroquinone with phytol in the presence of zinc and hydrochloric acid is known [Japanese Patent Publication No. 31662/1970].

It has been found that by these processes, there occurs the formation of undesirable side products which contaminate the final product. The formation of these undesirable side products is very disadvantageous. These side products are very difficult and expensive to remove in order to provide the chromanol in the purified and uncontaminated state necessary for use as an edible additive.

SUMMARY OF INVENTION

The present invention is directed to a process for the production of chromane derivatives of the formula:

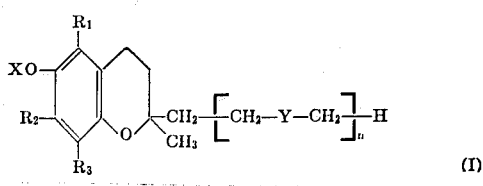

wherein Y is

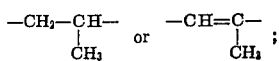

$n$, is an integer from 0 to 3, X is hydrogen, alkanoyl, or aroyl, and $R_1$, $R_2$ and $R_3$ are individually hydrogen or methyl by condensing a hydroquinone of the formula

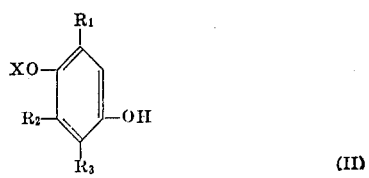

wherein X, $R_1$, $R_2$ and $R_3$ are as above with a compound selected from the group consisting of compounds of the formula

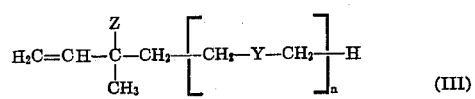

or

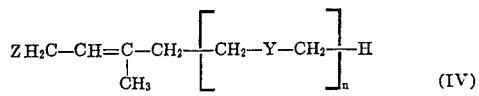

wherein Y and n are as above; and Z is halogen, hydroxy, etherified hydroxy or esterified hydroxy;

in the presence of an iron component selected from iron, iron (II) chloride (Ferrous chloride) or mixtures thereof.

In the case where X in the compound of formula I is hydrogen, the free hydroxy group on compound of formula I can be esterified by any conventional means of esterification.

The process of this invention produces the chromanols of formula I, in a substantially purer form, as determined by gas chromatography, than that obtained by former processes.

DETAILED DESCRIPTION

The term alkanoyl as used herein denotes alkanoyl groups containing from 2 to 20 carbon atoms. Among the preferred alkanoyl groups are the lower alkanoyl groups. These lower alkanoyl groups are derived from lower alkane carboxylic acids which contain from 2 to 7 carbon atoms. Among the preferred lower alkane carboxylic acids are included acetic acid, propionic acid, etc. However, the term alkanoyl can include high alkanoyls which contain from 8 to 20 carbon atoms. These higher alkanoyl groups are derived from higher alkane carboxylic acids containing from 8 to 20 carbon atoms, preferably palmitic and stearic acid.

The term "aroyl" designates aroyl radicals containing at least 7 carbon atoms, preferably from 7 to 11 carbon atoms. These aroyl groups are preferably derived from aromatic carboxylic acids containing from 7 to 11 carbon atoms such as benzoic acid, toluic acid or xylylic acid with benzoic acid being expecially preferred.

The term halogen as used herein designates all four halogens, fluorine, chlorine, bromine and iodine with chlorine and bromine being preferred.

When Z is an etherified hydroxy group, the hydroxy group can be etherified with any conventional alcohol used to form ethers. As far as the process of this invention is concerned, it makes little difference what ether is present. Among the preferred etherified hydroxy groups are the lower alkoxy groups, i.e., ethers formed from lower alkanols containing from 1 to 7 carbon atoms. Among the preferred alcohols for forming these ethers are methanol, ethanol and isopropanol.

When Z is an esterified hydroxy group, the hydroxy group can be esterified with any conventional organic carboxylic acid or organic sulfonic acid. As far as the process of this invention is concerned, it makes no difference what ester group is present as Z. Among the preferred acids which can be utilized to form the ester group Z are lower alkane carboxylic acid containing from 2 to 7 carbon atoms and those mentioned hereinbefore with acetic acid being especially preferred. Among other preferred acids are the aromatic carboxylic acids containing from 7 to 11 carbon atoms such as those mentioned hereinbefore with benzoic acid being preferred. Among the other preferred acids are the alkyl- or aryl-sulfonic acids. The preferred alkylsulfonic acids are the lower alkylsulfonic acids containing from 1 to 7 carbon atoms, such as methane sulfonic acid. The preferred arylsulfonic acids are those containing from 6 to 11 carbon atoms such as benzenesulfonic acid and toluenesulfonic acid.

The condensation is preferably carried out in the presence of a solvent or diluent. Any conventional inert organic solvent can be utilized as the solvent or diluent medium. Generally, it is preferred to utilize inert organic solvents which form an azeotrope with water. Among the preferred solvents are the aliphatic or aromatic hydrocarbons or halogenated aliphatic or aromatic hydrocarbons such as trichloroethylene, benzene, chlorobenzene, toluene or xylene. The condensation can be carried out at a temperature between room temperature, i.e., 20° C and the boiling temperature of the condensation mixture. The course of the condensation can be accelerated by elevation of the temperature. Generally, it is preferred to carry out the temperature at the reflux temperature of the reaction medium. head In carrying out this reaction, it is generally preferred to remove the water that is formed during the reaction. This makes the reaction proceed faster. The water formed can be removed, in accordance with a preferred embodiment of this invention, by forming a low boiling azeotrope with the inert organic solvent e.g., toluene-water [79,8 percent toluene-20,2 percent water; BP: 85° C].

The hydrogen chloride can be used both in gaseous or in dissolved form, such as dissolved in water. If the hydrogen chloride is used in the form of aqueous hydrochloric acid, it is preferred to remove the water from the reaction medium prior to the addition of the compound of formula III or IV to the reaction medium. This can be done by adding the aqueous hydrochloric acid to a reaction medium containing the compound of formula II dissolved in an inert organic solvent such as a solvent which forms a low boiling azeotrope with water. The water can then be removed from the reaction medium by conventional means such as by separation or by removal in the form of an azeotropic mixture with an inert organic solvent such as toluene or benzene. Any hydrogen chloride that may be lost by this separation or removal step can be compensated for by the addition of an amount of aqueous hydrochloric acid sufficient to maintain the reaction medium congo red. It is generally preferred that the hydrogen chloride be present in the reaction medium in an amount of from 0,5 to 8 moles per mole of the compound of formula II.

The iron component can be either iron, iron (II) chloride or mixtures thereof. The iron that is normally used is generally in fully powdered form. The amount of iron component used can vary between 0.05 to about 1 g atoms per mole of the compound of formula II.

In the condensation process of this invention, it is generally preferred to utilize equimolar amounts of the compound of formula II and the compound of formula III or IV or employ a small excess of the compound of formula II. However, excess of either the compound of formula II or the compound of formula III or IV can be employed in the reaction medium.

The condensation of a hydroquinone of formula II with the compound of formula III or IV is carried out in accordance with a preferred embodiment of the present invention, by suspending the hydroquinone in a solvent, preferably in toluene, and, after the addition of iron powder, gassing the suspension with hydrogen chloride, heating the mixture to boiling temperature and then treating it dropwise with isophytol. The water released is continuously separated off and the unconsumed iron powder filtered off. The filtrate is subsequently worked up to produce the compound of formula I by conventional procedures. One method is by first concentrating the clear solution. The chromane derivative which separates is taken up in a solvent, for example, in hexane. The extract is shaken out, expediently with 80 percent by volume aqueous methanol, in order to remove impurities present and is thereafter evaporated. The chromane derivative which remains behind can be distilled in a high vacuum.

Examples of the chromane derivatives of formula I having a saturated side-chain which can be manufactured in accordance with the present invention are:

5,7,8-trimethyl-tocol [$\alpha$-tocopherol]
5,7-dimethyl-tocol [$\xi_2$-tocopherol]
5,8-dimethyl-tocol [$\beta$-tocopherol]
7,8-dimethyl-tocol [$\gamma$-tocopherol]
5-methyl-tocol
7-methyl-tocol [$\eta$-tocopherol]
8-methyl-tocol [$\delta$-tocopherol]tocol Of the chromane derivatives of formula I having an unsaturated side-chain which can be manufactured in accordance with the present invention, the following are preferred:

2,5,7,8-tetramethyl-2-(4,8,12-trimethyl-tri deca-3, 7,11-trienyl)-6-chromanol
5,8-dimethyl-2-(4,8,12-trimethyl-trideca-3,7,11-trienyl)-6-chromanol [$\epsilon$-tocopherol]
7,8-dimethyl-2-(4,8,12-trimethyl-trideca-3,7,11-trienyl)-6-chromanol
8-methyl-2-(4,8.12-trimethyl-trideca-3,7,11-trienyl)-6-chromanol.

The tocols other than $\alpha$-tocopherol obtainable according to the process provided by the invention and the corresponding chromane derivatives which are unsaturated in the side-chain have vitamin E activity of varying strength.

The application is further illustrated by the following examples. In the examples, the term "80 percent aqueous methanol" denotes a mixture containing 80 percent by volume methanol and 20 percent by volume water. The term "concentrated aqueous hydrochloric acid" denotes an aqueous solution containing 32 percent by weight hydrochloric acid.

Example 1

117 g (0.77 mole) of trimethylhydroquinone and 5.6 g (0.10 g. atoms) of iron powder are suspended in 255 ml of toluene. The suspension is heated to boiling under reflux conditions with the introduction of hydrogen chloride and treated dropwise with 222 g (0.75 mole) of isophytol. The water released is continuously separated off in a separator. After completion of the addition, the condensation mixture is stirred for a further 30 minutes, then cooled and filtered off from unreacted iron powder. The filtrate is worked up by the procedure given below. The filtrate is evaporated under reduced pressure. The residue is taken up in 1000 ml of hexane. The extract is shaken out three times with 150 ml of 80 percent aqueous methanol each time and subsequently evaporated. The residual crude $\alpha$-tocopherol is heated to boiling under reflux conditions for 5 hours with 200 g of acetic acid anhydride. The crude $\alpha$-tocopherol acetate remaining behind after distilling off the excess acetic acid anhydride is subsequently distilled in a high vacuum. α-Tocopherol acetate which is about 100 percent pure according to gas chromatography is thereby obtained.

Example 2

117 g (0.77 mole) of trimethylhydroquinone, 5.6 g (0.10 g. atoms) of iron powder and 30 ml of concentrated aqueous hydrochloric acid are suspended in 345 ml of toluene. The water is distilled off as an azeotrope. 222 g (0.75 mole) of isophytol and simultaneously 20 ml of concentrated aqueous hydrochloric acid are subsequently added dropwise to the suspension at the boiling point within 4 hours. The condensation mixture is again treated dropwise at the boiling point with 30 ml of concentrated aqueous hydrochloric acid, stirred for 40 minutes, then cooled and filtered off from the unreacted iron powder. The filtrate is worked up as described in Example 1 to give α-tocopherol acetate which is about 100 percent pure according to gas chromatography.

Example 3

117 g. (0.77 mole) of trimethylhydroquinone and 5.6 g (0.10 g. atoms) of iron powder are suspended in 255 ml of toluene. The suspension is heated to boiling under reflux conditions with the introduction of hydrogen chloride and subsequently treated dropwise while gassing with nitrogen within 4 hours with 236 g (0.75 mole) of phytyl chloride. The condensation mixture is then stirred for a further 30 minutes, then cooled and filtered off from the unreacted iron powder. The filtrate is worked up as described in Example 1 to give α-tocopherol acetate which is about 100 percent pure according to gas chromatography.

Example 4

117 g (0.77 mole) of trimethylhydroquinone and 12.7 g (0.10 mole) of anhydrous iron (II) chloride are suspended in 600 ml of toluene. The suspension is heated to boiling under reflux conditions with the introduction of hydrogen chloride and subsequently treated dropwise within 4 hours with 222 g (0.75 mole) of isophytol. The condensation mixture is then stirred for a further 30 minutes, cooled and filtered off from the unreacted iron. The filtrate is worked up as described in Example 1 to give α-tocopherol acetate which is about 100 percent pure according to gas chromatography.

Example 5

117 g (0.77 mole) of trimethylhydroquinone and 5.6 g (0.10 g. atoms) of iron powder are suspended in 255 ml of toluene. The suspension is heated to boiling under reflux conditions with the introduction of hydrogen chloride and subsequently treated dropwise within 4 hours with 170 g (0.75 mole) of 3,7,11-trimethyl-dodeca-1-en-3-ol. The condensation mixture is stirred for a further 30 minutes, cooled and filtered off from the unreacted iron. The filtrate is worked up as described in Example 1 to give 2,5,7,8-tetramethyl-2-(4,8-dimethyl-nonyl)-6-chromanol acetate which is about 100 percent pure according to gas chromatography.

We claim:

1. A process for the manufacture of chromane derivatives of the formula:

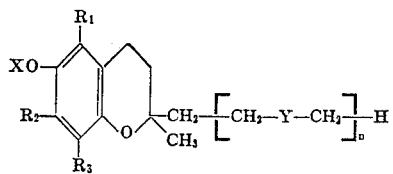

wherein Y is

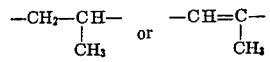

$n$ is an integer of from 0 to 3; X is hydrogen, alkanoyl containing from 2 to 20 carbon atoms or carbocyclic aroyl containing from 7 to 11 carbon atoms; and $R_1$, $R_2$ and $R_3$ are individually hydrogen or methyl; which process comprises condensing a hydroquinone of the formula:

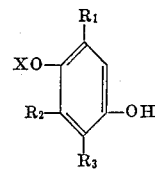

wherein X, $R_1$, $R_2$ and $R_3$ are as above, with a compound of the formula:

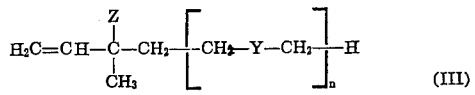

or

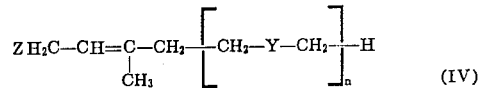

wherein Y and n are as above; and Z is halogen, hydroxy, lower alkoxy, lower alkanoyloxy, lower alkyl sulfonyloxy, carbocyclic aroyloxy containing from 7 to 11 carbon atoms or carbocyclic aryl sulfonyloxy containing from 6 to 11 carbon atoms; in the presence of an iron component selected from the group consisting of iron, iron (II) chloride, or mixtures thereof and hydrogen chloride.

2. The process of claim 8, wherein the condensation is carried out in the presence of gaseous hydrochloric acid.

3. The process of claim 8, wherein the condensation is carried out in the presence of aqueous hydrochloric acid.

4. The process of claim 8, wherein the condensation is carried out in the presence of inert organic solvent capable of forming an azeotropic mixture with water.

5. The process of claim 4, wherein the solvent is toluene.

6. The process of claim 4, wherein the condensation is carried out in the presence of trichloroethylene or chlorobenzene.

7. The process of claim 8 wherein the condensation is carried out under reflux.

* * * * *